Feb. 1, 1966  W. A. LANG  3,232,472
ELECTRICAL DEVICE BOX
Filed Sept. 11, 1962

INVENTOR.
William A. Lang
BY
Webb Mackey & Burden
HIS ATTORNEYS 3,232,472
ELECTRICAL DEVICE BOX
William A. Lang, Pittsburgh, Pa., assignor to
Steel City Electric Company
Filed Sept. 11, 1962, Ser. No. 222,783
1 Claim. (Cl. 220—3.9)

This application relates to an electrical device box, more particularly a box in which switches, receptacles, etc., can be mounted.

Switches, receptacles, etc., forming parts of an electrical system for a building are generally mounted in sheet metal boxes variously referred to as outlet boxes, switch boxes or device boxes. These boxes, in turn, are nailed to wall studding before plaster or other wall material is secured to the studding. For many years, it was the practice to secure the boxes to the studding by passing nails through interior holes in opposed sides of the boxes and driving the nails into the studding. This method of fastening the boxes, however, had the defect of reducing the cubic inch capacity thereby limiting the number of wires that could be led into and out of the box. Accordingly, it has been proposed to provide apertured ears or lugs which extend outwardly from both edges of both sides of the box and to pass nails through these lugs on the outside of the box and then drive the nails into the studding. From an installation point of view, such boxes are entirely satisfactory, but from a manufacturing point of view, they are unsatisfactory because the lugs require extra metal and create additional scrap loss.

I have solved these problems by forming nail straps which are punched out of the ends of a device box to form loops through which the nails can be passed for securing the box to studding. These straps do not require additional metal since they are formed from the ends of the box and they do not create any scrap loss.

In the accompanying drawings, I have illustrated a presently preferred embodiment of my invention in which.

Figure 1:
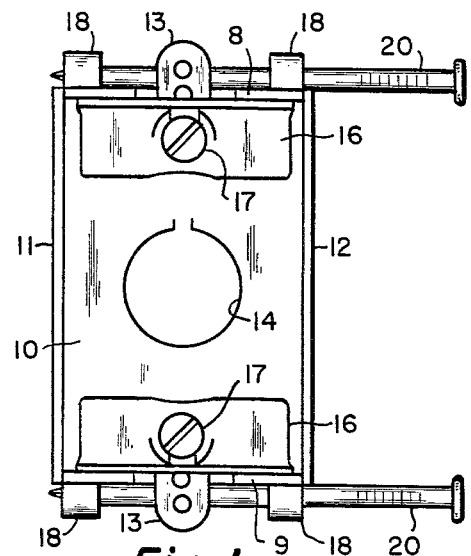
FIGURE 1 is a front view of an electrical device box embodying my invention.
Figure 2:
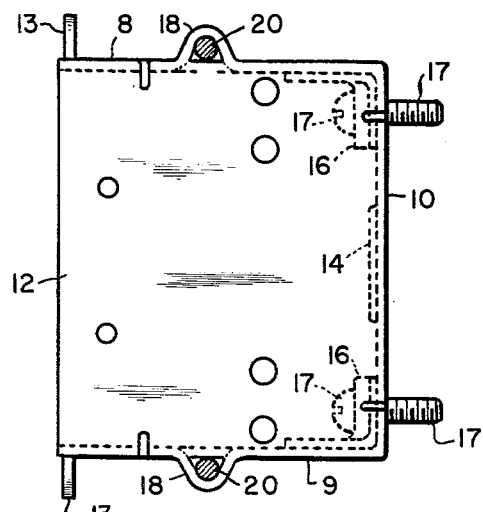
FIGURE 2 is a side view of the box of FIGURE 1.
Figure 3:
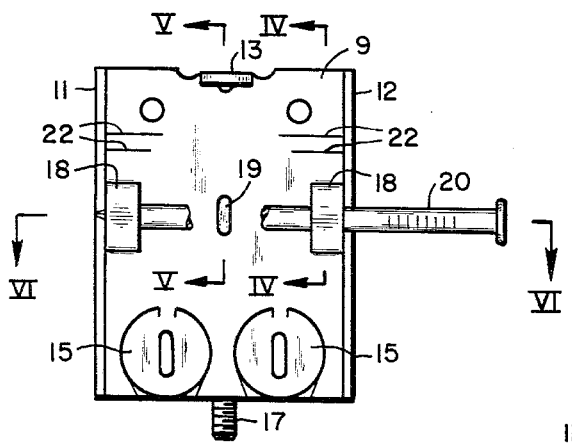
FIGURE 3 is an end view of the box of FIGURE 1.

Referring to the drawings, an electrical device box embodying my invention comprises a sheet metal rectangular box having ends 8 and 9, a back 10 and sides 11 and 12. It is open at the front. The ends 8 and 9 and the back 10 may be formed by stamping a single strip of sheet metal. The sides 11 and 12 are projection welded to this central metal strip after it has been bent to the configuration shown in FIGURE 2. Lugs 13 extend from the front edges of the ends 8 and 9 and at right angles to these ends. They are tapped for screws to hold an electrical device within the box.

The back 10 of the box has a knockout plug 14, and each end of the box also has two non-metallic cable clamps 16 which are mounted adjacent the ends of the box on machine screws 17 threaded in the back 10 of the box. Cable passed through the pryouts 15 is held between the clamps 16 and the back of the box by turning the machine screws 17.

Figures 4, 5:
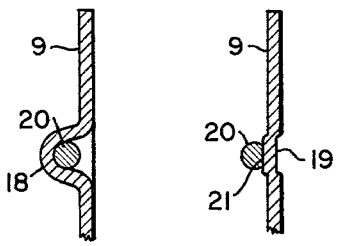
FIGURE 4 is a section along the lines IV—IV of FIGURE 3.
FIGURE 5 is a section along the lines V—V of FIGURE 3.

The ends 8 and 9 of the box each have two nail straps 18 adjacent each edge of the ends. These straps are punched out of the material forming the ends of the box to form loops which extend outwardly from the outer surface of the box ends sufficiently that a nail can be passed between the loops and the outer surfaces of the box ends and thereby held. The two loops on each end are in line with each other so that a nail can be passed through both loops. Both ends of each loop are integral with the box ends to provide strength. The loops are curved so that their inner surfaces contact approximately one-half the surface of a nail (see FIGURE 4) and thereby effectively close the box ends adjacent the loops.

It is the practice to sell the electrical device boxes with nails installed in them ready for nailing the boxes to studding. To keep the nails in the straps during shipment and handling, each box end also has a small boss 19 which extends outwardly from the outer surface of the box end and which is in line with the straps 18 on that end. Nails 20 placed in the boxes have notches 21, and the nail is placed in the straps so that the boss 19 fits into the notch 21 and holds the nail in the straps 18 against easy removal.

Figure 6:
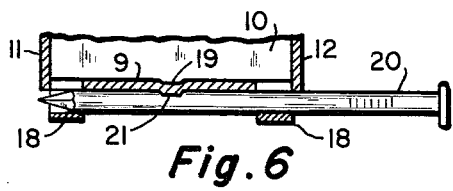
FIGURE 6 is a partial section along the lines VI—VI of FIGURE 3.
Figure 7:
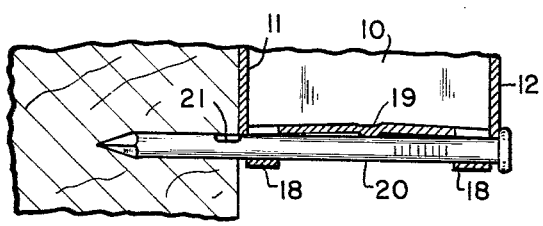
FIGURE 7 is a section similar to FIGURE 6 but showing the box nailed to studding.

FIGURE 6 shows one of the two nails with which each box is equipped installed in a box ready for use. To mount a box, an electrician simply holds it against the studding at the place desired, and extending from the studding a distance indicated by the score lines 22, and drives the nails into the studding as illustrated in FIGURE 7. The grip between the boss 19 on the box ends will prevent easy withdrawal of the nail from the straps but it will not prevent the nail from moving under a hammer blow.

From the foregoing it is apparent that I have provided an electrical device box which carries mounting nails on the outside of the box and which can be manufactured at low cost. The ends, back, knockout on the back, the pryouts on the ends, the lugs 13 and the nail straps 18 can all be formed from a single piece of metal in one stamping operation. In a single second step, the sides 11 and 12 can be welded to this strip after it has been formed. The nail straps hold the nails in position at all times for mounting the box on a stud, and they carry the nails on the outside of a box but do not require additional metal or create scrap loss.

While I have described a presently preferred embodiment of my invention, it is to be understood that it may be otherwise embodied within the scope of the appended claim.

I claim:
An electrical device box comprising,
(A) a sheet metal rectangular box having two sides, two ends and a back and open at the front,
(B) two nail straps on each box end, said straps
    (1) being integral with the ends
    (2) extending outwardly from the box to form loops, and
    (3) spaced from each other across an end and in line with each other whereby a nail may be passed through the loops,
(C) an outwardly extending boss on each end between said straps and in line with them,
(D) a nail extending through the loops formed by the straps on each end and across said boss, and
(E) a notch in the nail engaging the boss whereby easy withdrawal of the nail is prevented.

References Cited by the Examiner
UNITED STATES PATENTS

| | | | |
|---|---|---|---|
| 1,026,164 | 5/1912 | Hoffman | 220—3.9 |
| 2,730,261 | 2/1956 | Tutt | 220—3.7 |
| 2,738,894 | 3/1956 | Cook et al. | 220—3.9 |

THERON E. CONDON, *Primary Examiner.*